United States Patent [19]

Rassier

[11] Patent Number: 5,109,895
[45] Date of Patent: May 5, 1992

[54] CUTTING ATTACHMENT FOR TRENCHER

[76] Inventor: Wallace J. Rassier, P.O. Box 245, Williston, N. Dak. 58801

[21] Appl. No.: 662,777

[22] Filed: Feb. 28, 1991

[51] Int. Cl.$^5$ .............................................. A01G 23/06
[52] U.S. Cl. .................................... 144/2 N; 37/2 R; 144/162 R; 241/101.7
[58] Field of Search .................. 37/2 R, 189, DIG. 6; 241/101.7; 144/2 N, 218, 162 R, 221, 236, 237, 176; 299/75

[56] References Cited

U.S. PATENT DOCUMENTS 4,441,534  4/1984  Wilson ................................. 144/2 N
4,690,183  9/1987  Eilertson ............................. 144/2 N

*Primary Examiner*—W. Donald Bray
*Attorney, Agent, or Firm*—Robert E. Kleve

[57] ABSTRACT

The invention comprises a cutting attachment for a trencher wherein the trencher has a pivotally mounted trencher arm with a drive sprocket gear for driving an endless chain and with a socket mounting at the outer end of the arm for mounting an outer sprocket for connecting a endless chain between the sprockets to drive the outer sprocket. The cutting attachment comprises a yoke having three legs with a shaft rotatably mounted between two of the legs and a outer sprocket fixed thereon and therebetween. A cutting blade is fixed to said shaft to be rotated with said shaft. A housing is provided to enclose a portion of the blade and is fixed to the yoke. The third leg of the yoke is mounted in the socket of the trencher arm whereby the trencher may power the drive sprocket to thereby rotate the outer sprocket through the endless chain and the outer sprocket may rotate the cutting blade, so that the arm may be pivoted down to lower the cutting blade to cut objects near the ground in a downward path.

3 Claims, 1 Drawing Sheet

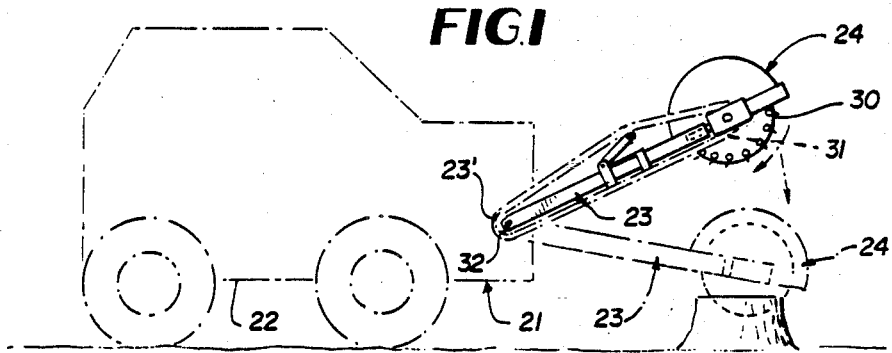
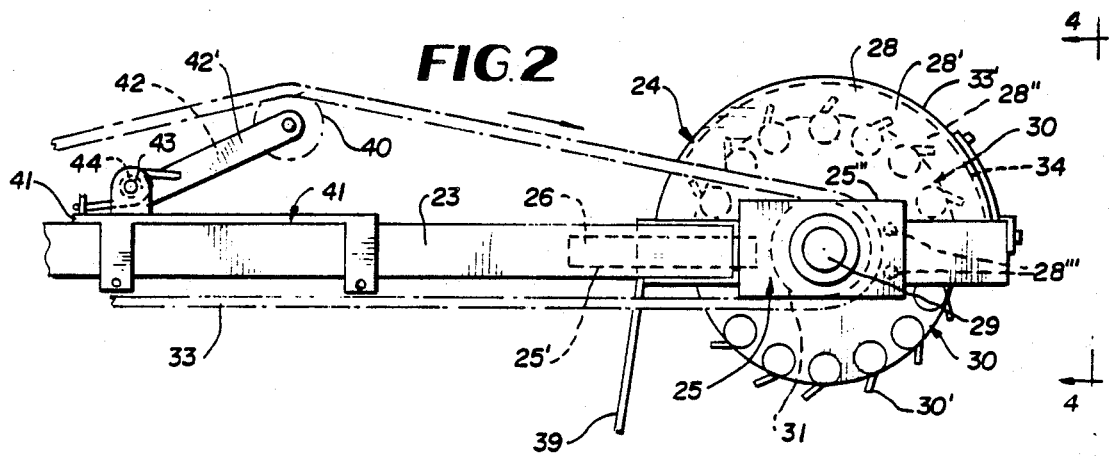
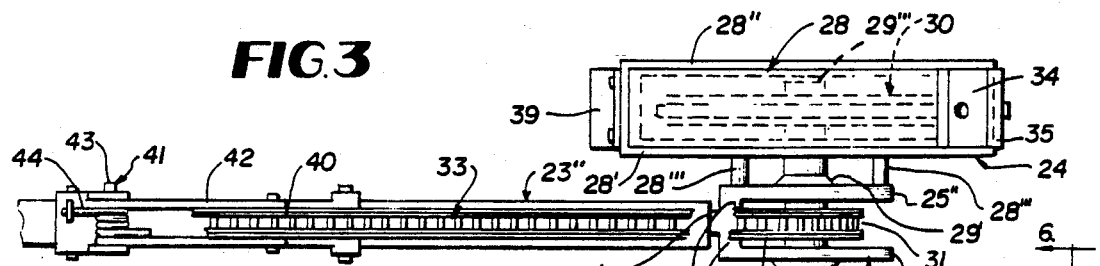
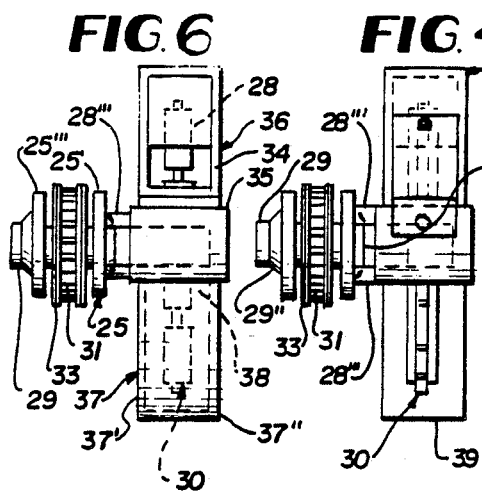
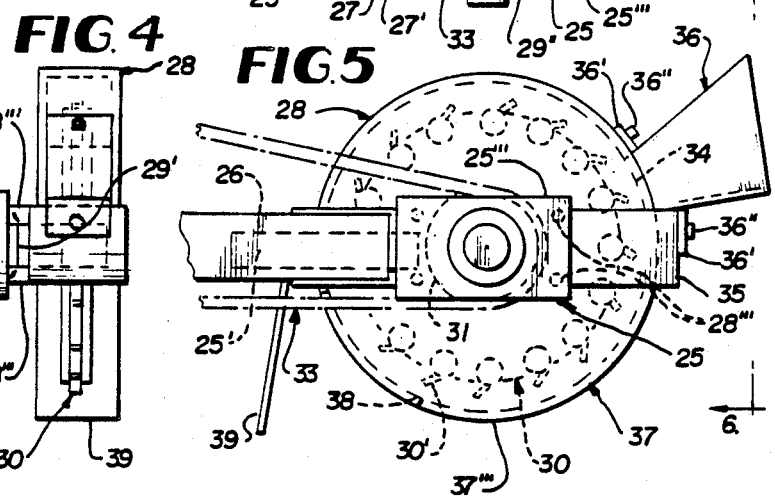

CUTTING ATTACHMENT FOR TRENCHER

BACKGROUND OF THE INVENTION

This invention relates to cutting attachments, more particularly, the invention relates to cutting attachments to trenchers.

It is an object of the invention to provide a novel cutting attachment to a trencher having a pivotally mounted arm and a drive sprocket for driving an endless chain and a socket at the outer end of the arm for supporting an outer sprocket and an endless chain between the sprockets, the cutting attachment having a blade with a yoke rotatably supporting the blade and outer sprocket. The yoke has one leg for mounting in the socket of the arm of the trencher whereby the drive sprocket can drive the chain and the chain can drive the cutting blade and the cutting blade can be lowered by the arm to cut vertically and near the ground.

It is another object of the invention to provide a novel attachment to a trencher to convert a trencher from an endless chain digging mechanism to a rotary blade saw cutting mechanism for cutting objects.

It is another object of the invention to provide a novel cutting attachment to a trencher to convert the trencher to a rotary blade mechanism for cutting tree stumps and the like and which cutting mechanism is also convertable to a cutting mechanism for cutting up tree branches and the like into smaller segments.

Further objects and advantages of the invention will become apparent as the description proceeds and when taken in conjunction with the accompanying drawing.

BRIEF DESCRIPTION OF THE DRAWING

FIG. 1 is a side elevational view of the trencher with the cutting attachment invention attached to the outer end of the trencher arm so that the chain drive of the trencher drives a radial blade of the cutting attachment invention.

FIG. 2 is an enlarged side elevational view of the cutting attachment device shown mounted to the outer end of the trencher arm, with a fragmentary showing of the trencher arm and socket.

FIG. 3 is an enlarged top view of the cutting attachment device, as shown in FIG. 2.

FIG. 4 is a front view of the device when taken along line 4—4 of FIG. 2.

FIG. 5 is an enlarged side elevational view of the cutting attachment device shown with the device modified or converted and mounted to the outer end of the trencher arm and socket, with the cutting attachment device modified or converted to cutting up tree branches and the like into smaller segments.

FIG. 6 is an enlarged front view of the modified or converted cutting attachment taken along line 6—6 of FIG. 5.

DESCRIPTION OF PREFERRED EMBODIMENT

Briefly stated, the invention comprises a cutting attachment device for attachment to a conventional earth digging chain driven trencher having a pivotally mounted arm with a drive sprocket at its lower end and a socket at the upper end of the arm for attachment of a sprocket gear at the outer end, said cutting attachment device having a radial blade on a shaft with a yoke rotatably supporting the blade and a sprocket o the shaft and with one leg of the yoke mounted in the socket of the arm. An endless chain is connected between the sprockets whereby the drive sprocket may drive the outer sprocket and the outer sprocket may drive the shaft and blade and the blade may be lowered by the arm to cut in a vertical path into objects such as tree stumps near the ground.

Referring more particularly to the drawing, in FIGS. 1, 2, and 3, the preferred embodiment is illustrated having a cutting attachment device 24 attached to a conventional trencher 21. The trencher has a main wheeled body 22 with a trencher arm 23 which pivots upward and downward about a pivotal connection 23' at its lower end with the main body. The cutting attachment 24 is shown attached to the outer end 23" of the trencher arm for cutting tree stumps and the like.

The cutting attachment device 24 has a yoke 25 with one leg 25' slidably mounted in a socket 26, which socket is fixed to the upper end of the arm 23. The yoke has its other two legs in parallelism with one another, with one leg fixed to the one side panel 28' of the housing 28 for the blade attachment by means of spaced rods 28''' fixed between the leg and housing. A shaft 29 is fixed to a cutting blade 30 and the shaft is rotatably mounted in two legs 25" and 25''' of the yoke by suitable bearings 29' and 29" mounted in the legs. The shaft 29 has its one end 29''' free of the side panel 28' and passes through an opening in the other side panel to rotate freely thereof. A conventional sprocket gear 31 is fixed to the shaft 29 between the legs 25" and 25'''.

The trencher 21 has a conventional lower drive sprocket gear 32 at the lower end of the trencher arm for driving an endless chain 33, which chain is attached about the sprocket gears 31 and 32, so that the sprocket gear 32 drives the sprocket gear 31 through the chain to drive the cutting blade 30 fixed to the shaft 29.

In this form of the invention, a housing 28 is provided which encloses only an upper portion of the blade 30 so that the lower portion of the blade projects below the housing 28. The housing 28 of the cutting blade attachment device has a pair of side walls 28' and 28" of a semi circular configuration and a curved center strip 33' which connects the side walls or panels together in fixed relation. The curved center strip provides an opening 34 at one edge of the center strip and a rectangular brace 35 surrounds the side walls 28' and 28" and the curved strip 33' and is fixed thereto, and the rectangular brace is fixed to the leg 25' of the yoke 25. The lower portion of the blade 30 projects below the housing 28, which is open at its bottom 36 to enable the blade 30 to engage tree stumps and the like from the top.

A conventional trencher will be converted for the cutting operation by removing a conventional endless chain having digging member thereon and removing the conventional upper sprocket gear member which is customarily mounted in the socket 26 of the trencher arm. Whereupon, the cutting attachment device will be mounted in the socket 26 by inserting the yoke leg 25' therein. A conventional link chain, without the digging members, will be attached about the sprockets 31 and 32 to drive the blade 30.

OPERATION

The trencher 21 will be moved or driven to a location where there are tree stumps in the ground that need to be removed, and it will be positioned so that the outer end of the trencher arm and the cutting attachment 24 are positioned above the stump that it is intended to remove.

The trencher will power drive the sprocket gear 32 which will rotate the chain which in turn will rotate the upper sprocket gear and blade 30. The cutting blade 30 will have conventional teeth 30' mounted thereon for cutting a relatively wide swath in the tree stump, and the trencher arm will be lowered to engage the cutting blade with the tree stump to cut a vertical path through the stump to the ground.

Some conventional trenchers have an articulate connection between their front and rear wheels with the trencher arm being mounted adjacent the front wheels so that the front of the trencher including the arm can be pivoted horizontally about the articulated connection from side to side. This construction enables the blade 30 to be pivoted horizontally across the stump after each vertical swath to cut an adjacent vertical swath through the stump to thereby cut up the stump in a veries of adjacent vertical cuts. Once the tree stump is completely cut down, the trencher can be moved to another stump for a similar operation.

ALTERNATIVE EMBODIMENT

The cutting attachment 24 may be modified as illustrated in FIGS. 4 and 5 for cutting up branches and tree lengths into shorter segments. The attachment 24 will be modified by mounting a spout 36 to the housing 28 by bolts 36" which project through flanges 36' and 36" fixed to the spout and are bolted into the center strip and rectangular brace respectively. Also, a bottom enclosure 37 will be provided which will be mounted to the bottom of the enclosure 28 to partly enclose the bottom of the blade 30. The bottom enclosure 37 has side panels 37' and 37" which extend down beside the bottom portion of the blade 30, and a bottom curved strip 37''' which extends partly about the bottom of the blade 30 and is fixed between the panels 37' and 37". A opening 38 is provided at the rear of the bottom enclosure and a rubber plate or panel 39 has its upper end fixed to the rectangular brace 35 and its lower end drapes down over the opening 38 to partly cover the opening 38 and deflect wood segments chopped by the blade downward out of the opening.

OPERATION

In the modified converted cutting attachment, the cutting attachment device is used to cut up or chop up wood or tree branches or lengths into shorter segments by inserting the branches into the blade 30 through the spout 36, which spout surrounds the opening 34 in the enclosure 28, and through the opening 34. The blade 30, which rotates clockwise when viewed from FIGS. 2 and 4 for both operations, will engage the end of the tree branch as it is received through the opening 34 and spout and it will chop it up with the chopped segments dropping out the enclosure 37 through the opening in the bottom half of the blade enclosure structure. The rubber panel or plate 39 will deflect any chopped up particles downward to the ground, which might be thrown rearwardly toward the rubber panel by the rotating chopping action of the blade.

The deflecting plate also acts to deflect any wood particles downward out the opening when the device 20 is used for cutting stumps.

The leg 25' has a connecting portion 27 and 27' which has only the height and depth of the leg 25' of the yoke an connects the leg 25' to legs 25" and 25''' and enables the chain 33 to pass above and below the leg 25' and connecting portions 27 and 27' in spaced relation onto and off the gear 31 for driving the gear 31.

A tension sprocket gear 40 is mounted on arm 23 between gears 31 and 32 and is spring urged upward against chain 33 to take up slack in chain 33 and keep it taut.

The sprocket gear 40 is mounted on arm 23 between gears 31 and 32 and it is spring urged upward against chain 33 to take up the slack in chain 33 and keep it taut.

The sprocket gear 40 is pivotally mounted to arm 23 by bracket 41. A pair of plates 42 and 42' have the gear 40 rotatably mounted between at their one common ends and their other common ends are fixed to shaft 43. Shaft 43 is pivotally mounted to pivot about its own axis on bracket 41 and bracket 41 is fixed to arm 23. A spring 44 has one end fixed to plate 42' and its intermediate portion wound about shaft 43 and its other end fixed to bracket 41. The spring is under compression as shown mounted and urges plates 42 and 42' upward thereby urging sprocket gear 40 upward against chain 33 to keep the chain taut.

Thus it will be seen that a novel cutting attachment has been provided for a conventional trencher which may be easily mounted to a conventional trencher so that it may be used with the cutting attachment device for cutting down tree stumps, and further, so that it may be used for chopping up tree branches and the like into small segments.

It will be obvious that various changes and departures may be made to the invention without departing from the spirit and scope thereof, and accordingly, it is not intended that the invention be limited to that specifically described in the specification or as illustrated in the drawing, but only as set forth in the appended claims.

What is claimed is:

1. A cutting attachment for a trencher wherein the trencher has a pivotally mounted trencher arm with a drive sprocket for driving an endless chain on said arm and a detachable mounting at the outer end of the arm for mounting an outer sprocket and a drive sprocket at the inner end of the arm with a endless chain therebetween for driving the outer sprocket, said cutting attachment comprising a yoke having three legs with a shaft rotatably mounted between two of the legs and an outer sprocket and cutting blade fixed to said shaft, said yoke having its third of said three legs mounted in said detachable mounting at the outer end of the arm whereby the inner sprocket drives the chain and thereby the outer sprocket and blade so that the blade may be used for cutting objects.

2. A cutting attachment for a trencher wherein the trencher has a trencher arm pivotally mounted at its one end to the trencher and having a sprocket gear at the one end of the arm and a socket at its other end of the arm with an endless chain on the arm, said attachment comprising a yoke having a base leg adapted to be detachably mounted in said socket of the arm and a pair of legs opposite the base leg with a sprocket rotatably mounted between the pair of legs and the endless chain connecting the sprocket at the one end of the arm with the sprocket mounted in the yoke at the other end of the arm with the sprocket mounted in the arm may drive the sprocket at the yoke at the other end of the arm, a radial blade fixed coaxially with the sprocket mounted in the yoke to rotate with said sprocket, said blade having a cutting edge at a substantially larger outer radius than said yoke sprocket whereby the arm may be lowered about its pivotal mounting to engage the radial blade against stumps and the like to cut into the stumps a substantial distance without stump surfaces adjacent the blade engaging the yoke sprocket, a housing enclosing the upper half of the radial blade.

3. A cutting attachment according to claim 2 wherein said housing has an opening, said attachment further including a spout for mounting about the opening in the upper half of the housing and a lower half housing detachably mounted to the upper half housing to adapt said cutting attachment to cutting up lengths of wood, said lower half housing having an opening opposite and below the opening in the upper half housing whereby lengths of wood may be fed into the opening in the upper half housing and cut up by engagement with the rotating radial blade and the inertial force of rotation of the blade and gravity may urge the cut up wood lengths out the opening in the bottom half housing.

* * * * *